United States Patent
Zhou

(10) Patent No.: US 11,692,667 B2
(45) Date of Patent: Jul. 4, 2023

(54) GEAR FINE-TUNING PAN-TILT

(71) Applicant: BEIJING SAVOYE IMAGE TECH CO., LTD, Beijing (CN)

(72) Inventor: Ruogu Zhou, Beijing (CN)

(73) Assignee: BEIJING SAVOYE IMAGE TECH CO., LTD, Beijing (CN)

( * ) Notice: Subject to any disclaimer, the term of this patent is extended or adjusted under 35 U.S.C. 154(b) by 133 days.

(21) Appl. No.: 17/595,543

(22) PCT Filed: Feb. 18, 2020

(86) PCT No.: PCT/CN2020/075715
§ 371 (c)(1),
(2) Date: Nov. 18, 2021

(87) PCT Pub. No.: WO2020/177527
PCT Pub. Date: Sep. 10, 2020

(65) Prior Publication Data
US 2023/0048054 A1 Feb. 16, 2023

(30) Foreign Application Priority Data

Mar. 2, 2019 (CN) .......................... 201910150163.0

(51) Int. Cl.
*F16M 11/00* (2006.01)
*F16M 11/12* (2006.01)
(Continued)

(52) U.S. Cl.
CPC .......... *F16M 11/126* (2013.01); *F16M 11/08* (2013.01); *F16M 11/105* (2013.01);
(Continued)

(58) Field of Classification Search
CPC .... F16M 11/126; F16M 11/08; F16M 11/105; F16M 11/125; F16M 11/128; F16M 11/04; F16M 11/10; G03B 17/561
See application file for complete search history.

(56) References Cited

U.S. PATENT DOCUMENTS 4,586,393 A * 5/1986 Mooney ................. F16M 11/18
74/411
5,224,675 A * 7/1993 Ellenberger ........... F16M 11/10
248/183.4
(Continued)

FOREIGN PATENT DOCUMENTS

CN 207179090 U 4/2018
CN 109764217 A 5/2019

OTHER PUBLICATIONS

International Search Report issued in International Application No. PCT/CN2020/075715; dated May 27, 2020; 6 pgs.
(Continued)

*Primary Examiner* — Amy J. Sterling
(74) *Attorney, Agent, or Firm* — Hauptman Ham, LLP

(57) ABSTRACT

A gear fine-tuning pan-tilt includes a rotating base, a roll worm support seat, a roll adjusting assembly, a pitch adjusting assembly, and a bearing seat arranged in sequence from bottom to top; the pitch adjusting assembly of the complete gear structure is located on the above, and the roll adjusting assembly located below adopts an arc-shaped rack structure, which reduces the interference to the pitching movement of the upper assembly and makes the height of the pan-tilt smaller. The arc opening of the arc-shaped rack faces upwards, so that the rotation axis is closer to the center axis of the lens. The upper and lower combination of the two structures strengthens the swing ability of the top of the pan-tilt in the limited size. The structure is able to be aimed at the subject through the rotating base, and leveled the left and right, and determined the pitch angle.

10 Claims, 7 Drawing Sheets

(51) Int. Cl.
    *F16M 11/08*     (2006.01)
    *F16M 11/10*     (2006.01)
    *G03B 17/56*     (2021.01)

(52) U.S. Cl.
    CPC ......... *G03B 17/561* (2013.01); *F16M 11/125* (2013.01); *F16M 11/128* (2013.01)

(56) References Cited

U.S. PATENT DOCUMENTS

| | | | | |
|---|---|---|---|---|
| 6,124,892 | A * | 9/2000 | Nakano | G08B 13/19632 348/373 |
| 6,203,216 | B1 * | 3/2001 | Koizumi | F16M 11/10 396/428 |
| 9,004,419 | B2 * | 4/2015 | Nakatani | F16M 11/2014 248/178.1 |
| 2004/0184798 | A1 * | 9/2004 | Dumm | F16M 11/18 396/428 |
| 2019/0093702 | A1 * | 3/2019 | Tiefenbrunn | F16C 11/106 |
| 2021/0362043 | A1 * | 11/2021 | Ban | F16C 11/06 |

OTHER PUBLICATIONS

International Preliminary Report on Patentability issued in International Application No. PCT/CN2020/075715; dated May 27, 2020; 10 pgs.

* cited by examiner

GEAR FINE-TUNING PAN-TILT

RELATED APPLICATIONS

The present application is a U.S. National Phase of International Application Number PCT/CN2020/075715 filed Feb. 18, 2020 and claims priority to Chinese Application Number 201910150163.0 filed Mar. 2, 2019.

TECHNICAL FIELD

The present invention relates to the technical field of photography and videography, in particular to a gear fine-tuning pan-tilt in the field of still life photography such as architecture and indoor space photography and product photography.

BACKGROUND

At present, the gear fine-tuning pan-tilt used for photography usually has three adjustable rotation axes xyz (or more rotation axes, such as the z1 axis of the top rotating platform). This type of pan-tilt usually has two-three gear structures, three-gear pan-tilt has a complete gear on the top or bottom for fine-tuning of the z-axis, while the three-gear pan-tilt and the two-gear pan-tilt both use a worm gear and worm structure with a curved rack or use a worm gear and worm structure with a complete gear, on the x and y-axes.

The pan-tilt with curved racks on both the x and y axes is restricted by the incompleteness of the worm gear. Pitch of large angles cannot be attained in the two axial directions, and can only be fine-tuned and cannot be used for camera lens movement. The advantage thereof is that the bearing capacity is larger and the size can be made smaller.

A variant design of this type of pan-tilt makes up for the pitch shortage by adding an independent folding structure, but the use of the folding structure reduces the stability of the pan-tilt, increases the complexity of the operation, and further increases the weight of the pan-tilt;

The pan-tilt with complete gears on the x and y axes often forces the upper and lower gear structures to accommodate each other due to interference between the various parts. They cannot achieve pitch of large angles. In order to increase the pitch angle, this type of pan-tilt can only increase the size of the pan-tilt.

In order to control the size of the pan-tilt, some pan-tilts (represented by the pan-tilt shown in FIG. 8) superimpose the x and y two-layer gear structure in a misalignment manner, which slightly reduces the height of the pan-tilt, but the lateral size of the pan-tilt is significantly increased. The weight is heavier and it makes the position of the handle easy to confuse.

The pan-tilt with two layers of gears misaligned allows both layers to achieve a single-sided 90° rotation, but the two layers have a large pitch angle, so that the two layers of structures both need a clutching design to quickly adjust the rotation angle. Therefore, in this design, in order to avoid interference caused by too many rods, the clutching and fine-tuning are combined on the same handle. This kind of clutching design requires continuous hand force when it is in the off state, which is very unsuitable for camera lens movement.

For some other pan-tilts (represented by the pan-tilt in FIG. 9), in order to control the size of the pan-tilt, the gear structure of the upper layer is miniaturized and placed on the gear structure of the lower layer. This arrangement makes the swing range of the upper structure obviously limited. The large pitch angle needs to be adjusted on the lower structure and the left and right level is adjusted on the upper structure. However, when the pitch angle is changed, the left and right level will also change. It needs to be leveled again, which reduces the photographing efficiency and is also not conducive to the camera lens movement.

The clutch knob of the gear and worm structure in the above of this type of pan-tilt is difficult to avoid interference with the structure in the below, and its top bearing platform will also interact with the housing of the worm gear and worm structure located below, the clutch knob, and the fine-tuning knob of the worm gear and worm structure located above.

Despite the above adjustments, there is still no gear fine-tuning pan-tilt that can achieve a pitch angle of more than 180° in the conventional pan-tilt size, and there is no gear fine-tuning pan-tilt that allows that in the two swing structures of x and y axes, the swing structure located above achieves a pitch angle of more than 180°.

In addition, there is no gear fine-tuning pan-tilt designed for photography. In view of the increasingly powerful camera functions of the current camera, this limitation of the gear fine-tuning pan-tilt is even more obvious.

In addition, the requirements that meet the usual photography habits are leveling in one direction (usually when the lens is facing the subject, the left and right sides of the camera are leveled) and leveling or pitching in the other direction (usually when the lens faces the subject, the camera is pitched forward and backward), and the pitch in this direction may be a large pitch, such as raising head to photography a tall building, or even photographing the building space directly above, or photographing objects directly below. Considering that the tripod itself is not necessarily completely in level, the pitch angle of the pan-tilt needs to exceed −90° to 90° to facilitate leveling when the camera faces directly up or down without adjusting the level of the tripod. However, none of the current gear fine-tuning pan-tilts can achieve a pitch angle of more than −90° to 90°. Although many gear fine-tuning pan-tilts can achieve a single-sided 90° angle, it is often necessary to reverse the camera by the rotating platform on the top or reinstalling the camera when photographing at large depression angles or large elevation angles; The ball type of pan-tilt and some other forms of pan-tilt can achieve −90° to 90° pitch, but cannot be fine-tuned. The pan-tilt that adopts the same gear structure in the two XY axial directions has no obvious directionality, nor has it completely solved the problem caused by interference.

Therefore, in view of the above problem, it is necessary to provide a new sgear fine-tuning pan-tilt.

SUMMARY

(1) Technical Problems to be Solved

The technical problem to be solved by the present invention is to provide a gear fine-tuning pan-tilt to solve the problem that the gear fine-tuning pan-tilt in the prior art cannot achieve a pitch adjustment of more than 180° in a conventional size and to ensure that the pitch is always kept at the left and right level during the whole pitching process, and takes into account the camera lens movement.

(2) Technical Solution

In order to solve the above technical problem, the present invention provides a gear fine-tuning pan-tilt, which includes a rotating base, a roll worm support seat, a roll adjusting assembly, a pitch adjusting assembly, and a bearing seat which are sequentially arranged from bottom to top; the pitch adjusting assembly is supported by a pitch support housing, the pitch support housing includes a pitch housing fixed part and a pitch housing rotating part that are rotatably engaged, and the lower part of the rotating base is connected with a pan-tilt support; the pitch adjusting assembly includes a pitch fine-tuning worm gear, a pitch fine-tuning worm and a pitch fine-tuning knob, the bearing seat is connected with the pitch housing rotating part, the pitch fine-tuning worm gear is engaged with the pitch fine-tuning worm, the pitch fine-tuning knob is connected to an end of the pitch fine-tuning worm, the pitch fine-tuning worm gear is a complete gear structure; the roll adjusting assembly includes a roll fine-tuning worm gear, a roll fine-tuning worm, and a roll fine-tuning knob. The roll fine-tuning worm gear is engaged with the roll fine-tuning worm, the roll fine-tuning worm is arranged on the roll worm support seat, the roll fine-tuning knob is connected to an end of the roll fine-tuning worm; the bottom of the pitch housing fixed part is fixed connected with the roll fine-tuning worm gear; the roll fine-tuning worm gear is an arc-shaped rack, and the arc opening of the arc-shaped rack faces upward; the roll worm support seat is in rotational contact with the pitch housing fixed part; the roll worm support seat is rotatably connected with the rotating base.

Wherein, the pitch housing fixed part includes a left fixed unit and a right fixed unit, the left fixed unit and the right fixed unit form a U-shaped piece, and the pitch housing rotating part is located between the left fixed unit and the right fixed unit. A pitch fine-tuning screw is installed in the left fixed part or the right fixed part, and the pitch fine-tuning worm gear is engaged with the pitch housing rotating part to drive the pitch housing rotating part to rotate.

Wherein, the pitch housing rotating part is an inverted U-shaped piece, and the pitch housing fixed part is located inside the inverted U-shaped piece; the pitch fine-tuning screw is installed in the pitch housing rotating part, the pitch fine-tuning worm gear is engaged with the pitch housing fixed part to drive the pitch housing rotating part to rotate.

Wherein, a handle installation position is provided outside the pitch housing rotating part.

Wherein, it further includes a pull rod and a clutch knob. The pitch fine-tuning worm gear includes a gear part and a tapered piece on one side of the gear part. The pitch housing rotating part has conical surface engaged with the tapered surface of the tapered piece on the inside thereof. One end of the pull rod is fixedly connected with the tapered piece, and the other end passes through the pitch housing rotating part to be threadedly connected with the clutch knob.

Wherein, it further includes a first dovetail track and a second dovetail track, a first dovetail track is arranged on the roll worm support seat, a second dovetail track is arranged at the bottom of the pitch housing fixed part, and the first dovetail track is engaged with the dovetail surface of the second dovetail track for the limiting rotation of the roll worm support seat and the pitch housing fixed part.

Wherein, the bearing seat is a bearing clamp seat, the bearing clamp seat is fixedly connected or rotationally connected with the pitch housing rotating part, the top of the bearing clamp seat has a platform, and a dovetail groove is provided on the platform. One groove side of the dovetail groove is a movable groove side, and the other groove side is a fixed groove side. The movable groove side is engaged with the fixed groove side through a clamp seat locking mechanism to install the quick installation piece on the platform The quick installation piece is used for equipment installation, and the quick installation piece has a dovetail limit rail that is engaged with the dovetail groove.

Wherein, the fixed groove side and/or the movable groove side is provided with a positioning notch, and the dovetail limit rail is provided with a positioning member at a position corresponding to the positioning notch.

Wherein, it further includes a handle bar, and a screw hole or a sunken stud can be connected to an end of the handle bar on the top of the bearing seat.

Wherein, it further includes a X-direction horizontal bubble, a Y-direction horizontal bubble, and a Z-direction horizontal bubble; the X-direction horizontal bubble is horizontally arranged on the side of the bearing seat, the Y-direction horizontal bubble is horizontally arranged on the outside of the pitch housing rotating part, and the Z-direction horizontal bubble is vertically arranged on the outside of the pitch housing rotating part.

(3) Beneficial Effects

The above-mentioned technical solution of the present invention has the following advantages: in order to solve the problem in the prior art, the above-mentioned technical solution provided by the present invention ensures that the swing structure located above can swing greatly in the swing structure in the x and y directions and is not interfered by the lower swing structure, so that the camera can be leveled and corrected by the lower swing structure during operation. After that, when the pitch of camera is adjusted, only the upper swing structure is adjusted, and the level in the non-adjustment direction is maintained.

Specifically, in the gear fine-tuning pan-tilt provided by the present invention, the rotating base, the roll adjusting assembly, and the pitch adjusting assembly sequentially form a three-layer structure. When in use, the rotating base of the bottom layer is firstly connected to the tripod, and the camera is turned to the subject through the rotating base. Then the second layer (roll adjusting assembly) is adjusted precisely by the roll fine-tuning knob to make the camera level and correct on the left and right, and then the third layer is adjusted to align with the photographing target, the pitch fine-tuning knob is rotated, and the pitch fine-tuning worm rotates to drive the pitch fine-tuning worm gear to rotate. The pitch fine-tuning worm gear drives the bearing seat and the camera on it to rotate in the pitch direction, thereby achieving fine-tuning in the pitch direction. If it needs to greatly change the pitch angle to compose the picture, the pitch fine-tuning clutch knob is released and the pitch adjusting assembly is turned quickly to approximate position, then the clutch knob is tightened, and the pitch fine-tuning knob is used to precisely adjust the pitch angle; the above operations are adjusted from bottom to top. Regardless of whether the ground is flat or not, the camera remains level in the non-pitch direction during the pitching process, and there is no need to adjust the left and right level again after the pitch angle is changed. The scene is a change from the up and down angles without deflection. It not only conforms to the photographing habits and facilitates the composition of the photograph, but also is very conducive to the upward or downward movement in the photographing. Moreover, the worm gear and worm structure of the complete gear is placed above the roll adjustment for the pitching action, which is easy to make the pan-tilt achieve large-angle pitch (over −90° to 90°). Therefore, the pan-tilt can simultaneously have the ability of large-scale pitching and precise leveling, it is convenient to take pictures and the positioning is accurate.

Wherein, the roll fine-tuning worm gear of the second layer adopts an arc-shaped rack, which makes full use of the characteristics of the arc-shaped rack. The limitation of the arc-shaped rack is that the adjustment range is small, so it serves as a simple roll-leveling, which is more suitable compared to the operation of pitch angle adjustment. However, relative to a complete gear, the curved rack has many advantages: firstly, it occupies less height, which can reduce the overall height of the second layer and the pan-tilt, making it easy to adjust left and right in a limited size space, and the structure is more compact; secondly, the arc opening of the arc-shaped rack faces upwards, so that when the camera is leveled in this direction, the rotation axis is above and is closer to the position of the lens, so the camera displacement is small during leveling. There is less unintended picture movement during the leveling process; thirdly, due to the curved rack structure, the bearing contact surface of the roll adjusting assembly is large, the bearing capacity and the bearing stability are good; fourthly, the roll adjusting assembly using the curved rack does not need to be equipped with a large-scale adjusting clutch assembly, and there is no operating rod that extends in the pitch direction, so the interference to the pitch adjusting assembly disposed above it is minimized, so that the pitch adjusting assembly can perform a large-scale pitching action; The entire pan-tilt has an accurate and quick positioning of a gear pan-tilt in a limited size, and achieves a large pitch like a ball type of pan-tilt, and the entire pitch process can maintain the left and right level.

Figure 1:
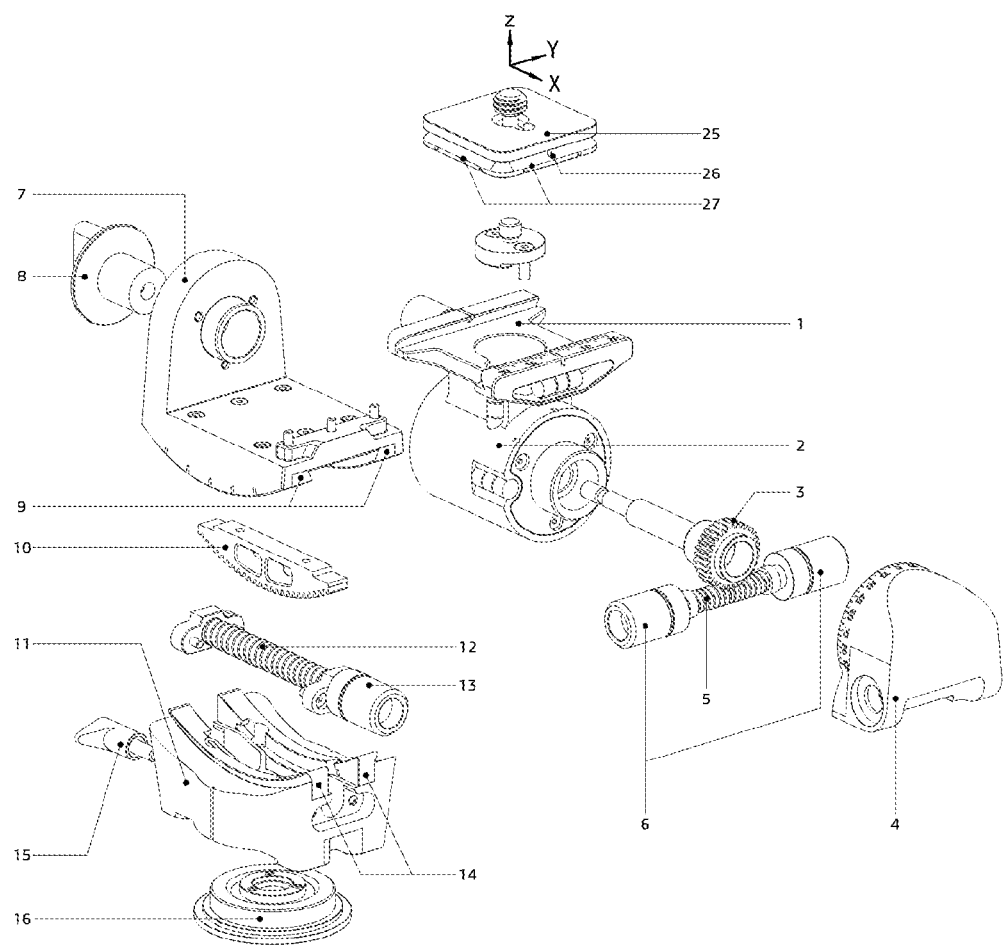
FIG. 1 is a schematic diagram of an assembly structure of the gear fine-tuning pan-tilt of the present invention.
Figure 2:
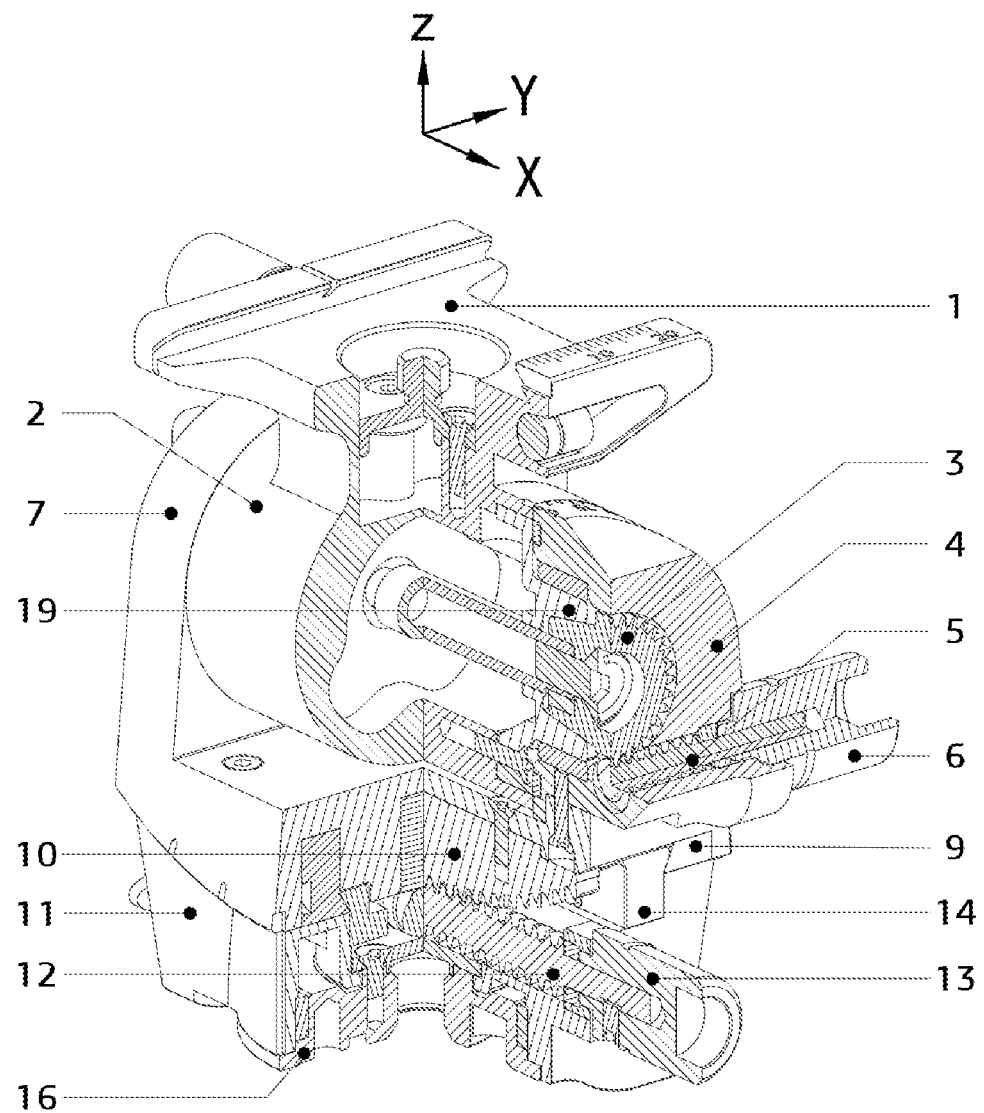
FIG. 2 is a schematic diagram of a cross-sectional structure of the gear fine-tuning pan-tilt of the present invention.
Figure 3:
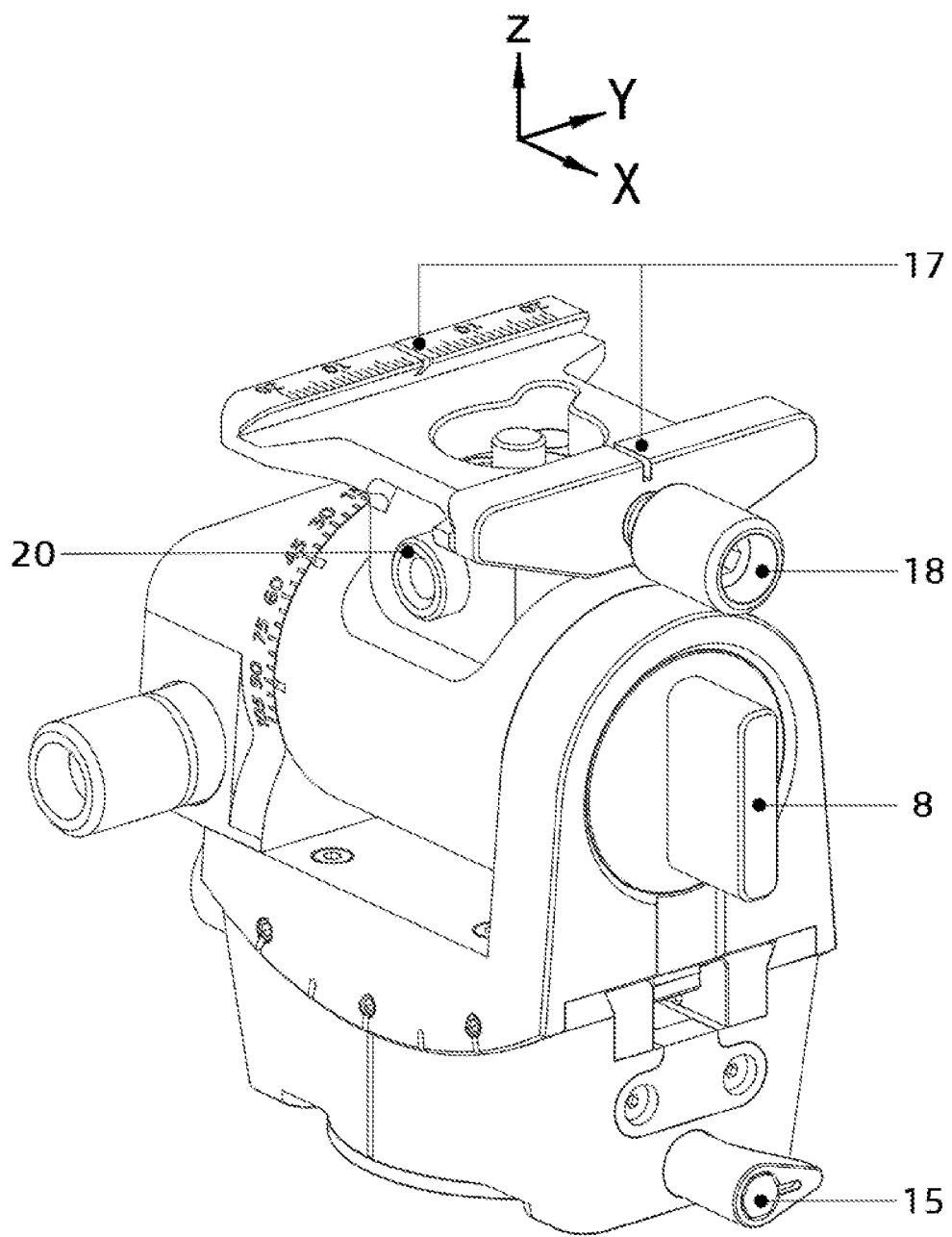
FIG. 3 is a schematic diagram of a side view of a three-dimensional structure of the gear fine-tuning pan-tilt according to the present invention.
Figure 4:
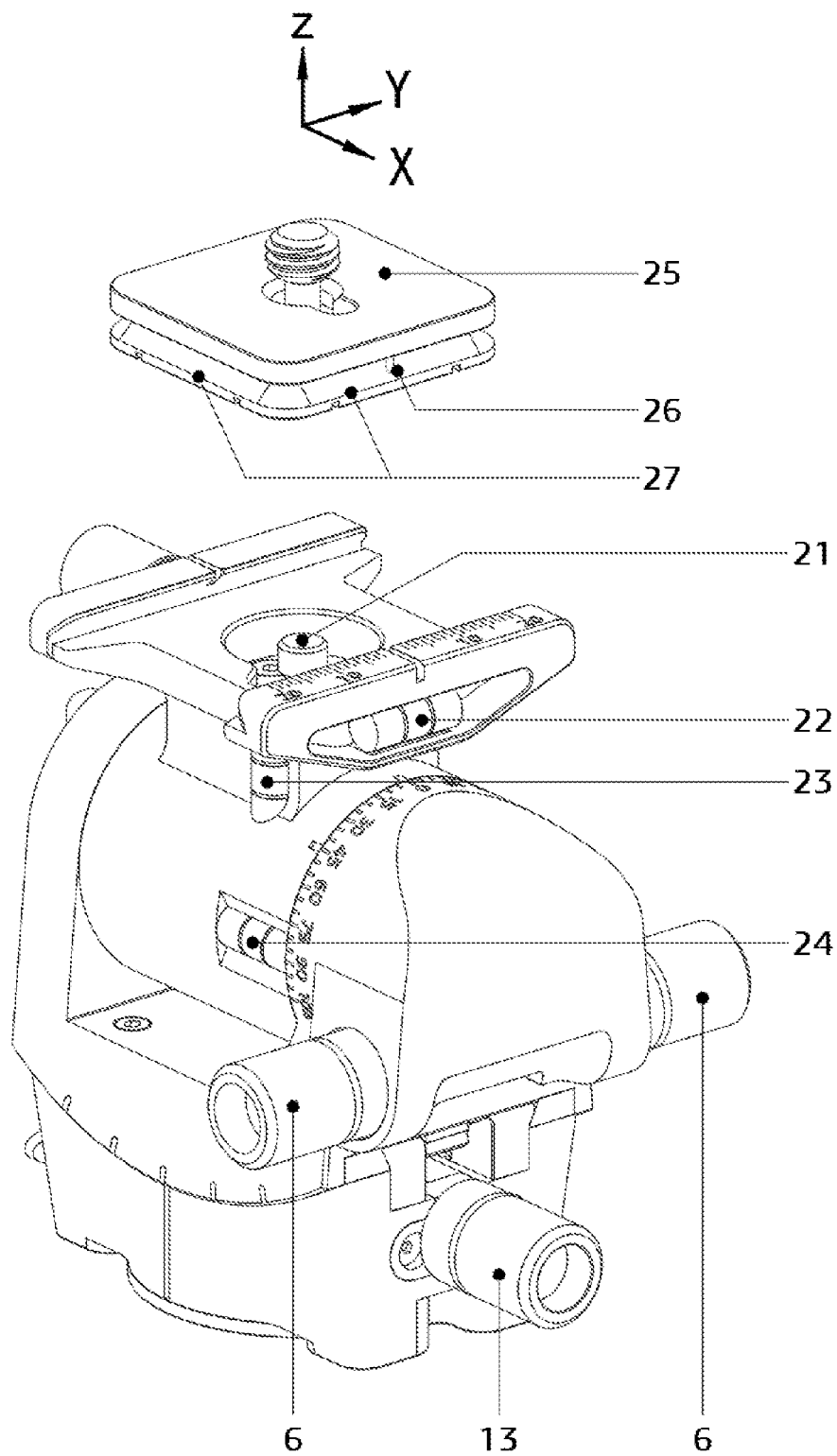
FIG. 4 is a schematic diagram of a structure of a quick installation piece installed on the bearing clamp seat in the gear fine-tuning pan-tilt according to the present invention.
Figure 5:
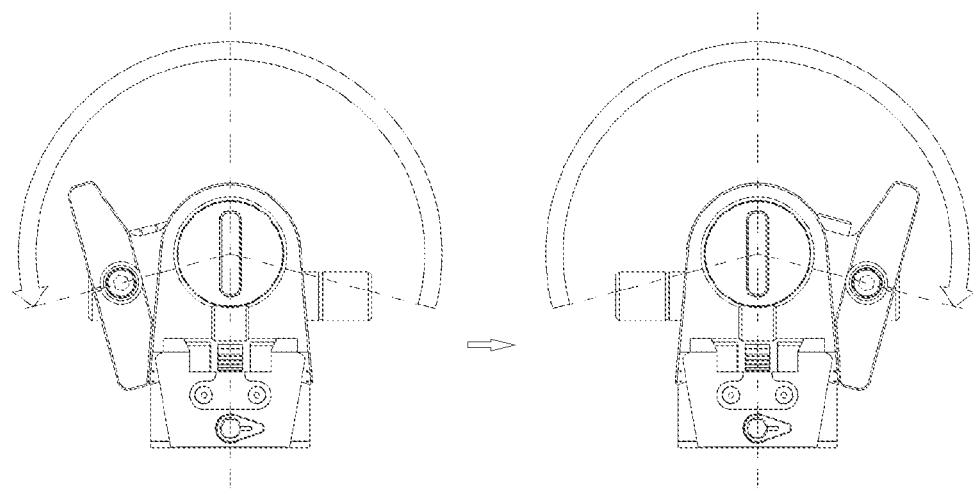
FIG. 5 is a schematic diagram of the pitch of the gear fine-tuning pam-tilt of the present invention.
Figure 6:
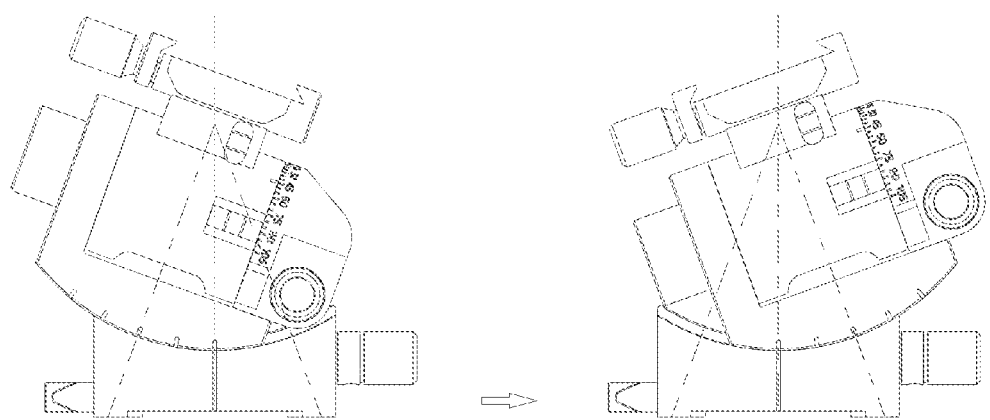
FIG. 6 is a schematic diagram of the roll of the gear fine-tuning pan-tilt according to the present invention.
Figure 7:
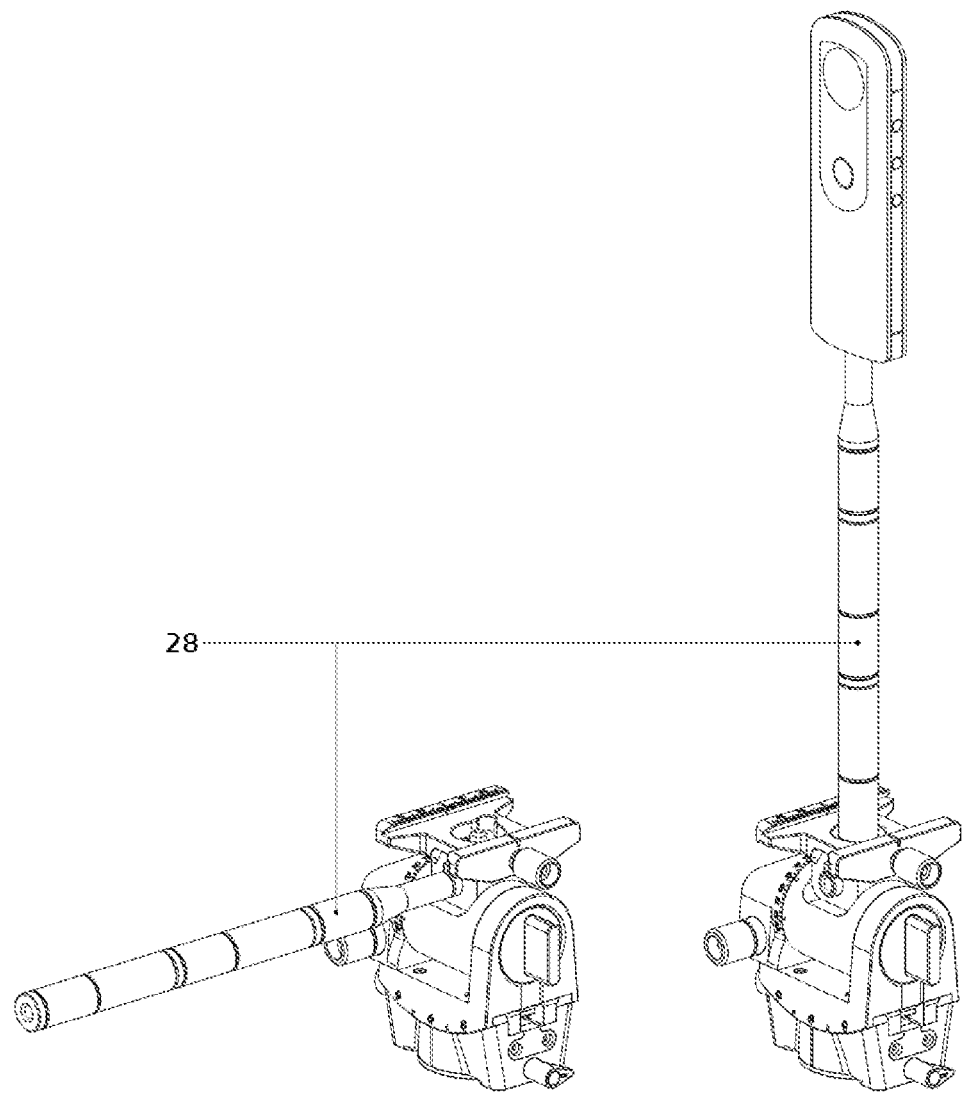
FIG. 7 is a schematic diagram of a structure of the handle bar disposed in the gear fine-tuning pan-tilt of the present invention.
Figure 8:
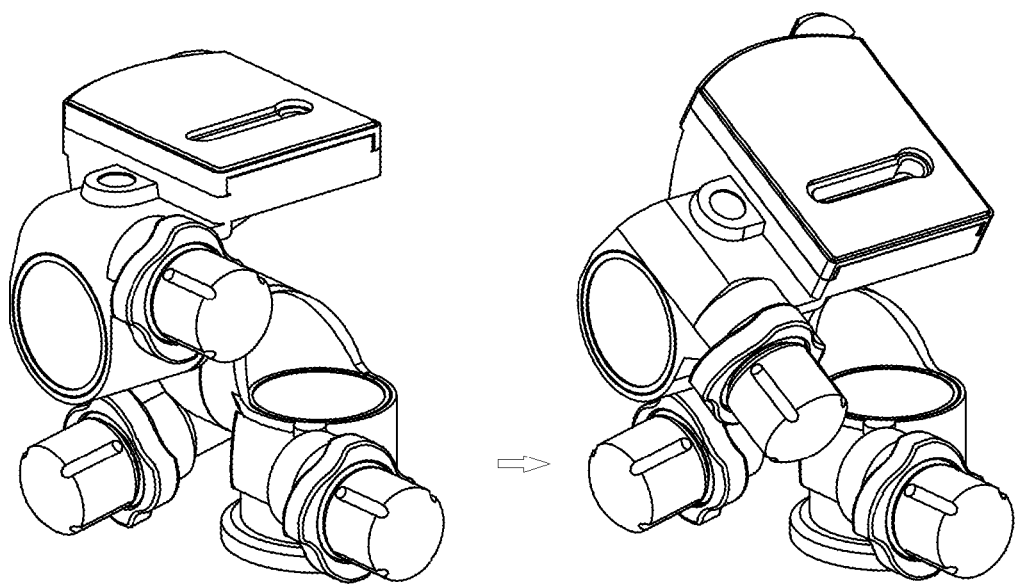
Figure 9:
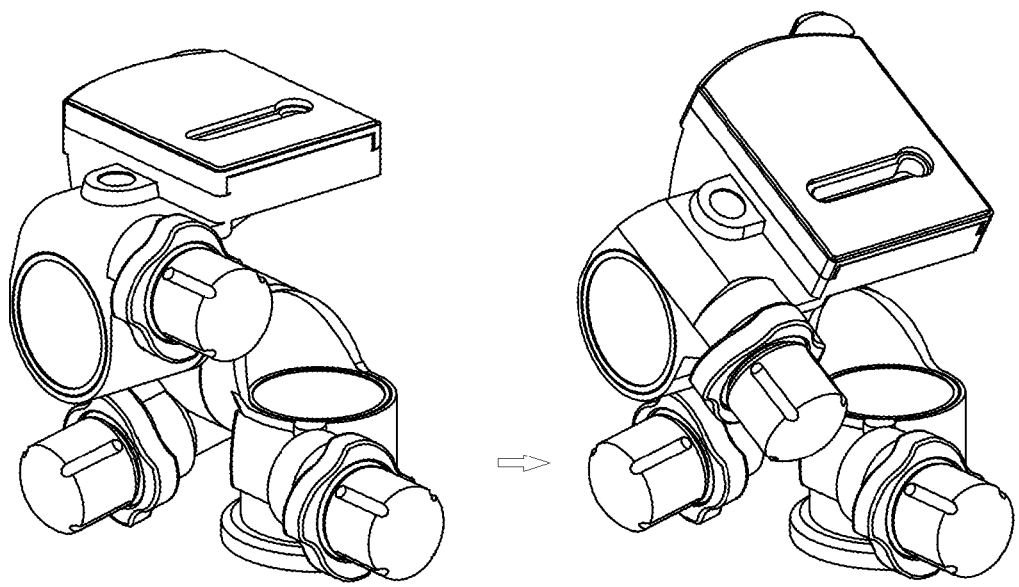

In the figures;

FIG. 8 is a schematic diagram of a structure of a pan-tilt in the prior art;

FIG. 9 is a schematic diagram of a structure of another pan-tilt in the prior art.

In the figures:

1. bearing clamp seat; 2. pitch housing rotating part; 3. pitch fine-tuning worm gear; 4. pitch housing right fixed unit; 5. pitch fine-tuning worm; 6. pitch fine-tuning knob; 7. pitch housing left fixed unit; 8. clutch knob; 9. second dovetail track; 10. roll fine-tuning worm gear; 11. roll worm support seat; 12. roll fine-tuning worm; 13. roll fine-tuning knob; 14. first dovetail track; 15. rotating base locking knob; 16. rotating base; 17. positioning notch; 18. clamp seat locking knob; 19. conical surface; 20. handle installation position; 21. sunken stud; 22. Y direction horizontal bubble; 23. Z direction horizontal bubble; 24. X direction horizontal bubble; 25. quick installation piece; 26. positioning piece; 27. dovetail limit rail; 28. handle bar.

DETAILED DESCRIPTION

The specific implementation of the present invention will be described in further detail below in conjunction with the accompanying drawings and embodiments. The following examples are used to illustrate the present invention, but not to limit the scope of the present invention.

In the description of the present invention, it should be understood that the orientation or positional relationship indicated by the terms "center", "longitudinal", "transversal", "upper", "lower", "front", "rear", "left", "right", "vertical", "horizontal", "top", "bottom", "inner", and "outer", etc. are based on the orientation or positional relationship shown in the drawings, and are only for the convenience of describing the present invention and simplifying the description, rather than indicating or implying that the pointed device or element must have a specific orientation and be constructed and operated in a specific orientation, and therefore cannot be understood as a limitation of the present invention. In addition, the terms "first" and "second" are only used for descriptive purposes, and cannot be understood as indicating or implying relative importance.

In the description of the present invention, it should be noted that, unless otherwise clearly specified and limited, the terms "installation", "connected with" and "connection" should be understood in a broad sense, for example, it can be a fixed connection or a detachable connection or an integral connection; it can be a mechanical connection or an electrical connection; it can be direct connection or indirect connection through an intermediate medium; it can be the internal communication between two components. For those of ordinary skill in the art, the specific meanings of the above-mentioned terms in the present invention can be understood in specific situations.

As shown in FIGS. 1-7, the gear fine-tuning pan-tilt provided by the present invention includes a rotating base 16, a roll worm support seat 11, a roll adjusting assembly, a pitch adjusting assembly and a bearing seat which are arranged in sequence from bottom to top; The pitch adjusting assembly is supported by a pitch support housing which includes a pitch housing left fixed unit 7, a pitch housing rotating part 2 and a pitch housing right fixed unit 4 which are rotatably engaged. The lower part of the rotating base is connected with a pan-tilt support. The pitch adjusting assembly includes a pitch fine-tuning worm gear 3, a pitch fine-tuning worm 5 and a pitch fine-tuning knob 6. The bearing seat is connected to the pitch housing rotating part, the pitch fine-tuning worm gear is engaged with the pitch fine-tuning worm. The pitch fine-tuning knob is connected to an end of the pitch fine-tuning worm. The pitch fine-tuning worm gear is a complete gear structure. The roll adjusting assembly includes a roll fine-tuning worm gear 10, a roll fine-tuning worm 12 and a roll fine-tuning knob 13. The roll fine-tuning worm gear is engaged with the roll fine-tuning worm, and the roll fine-tuning worm is disposed on the roll worm support seat. The roll fine-tuning knob is connected to an end of the roll fine-tuning worm. The bottom of the pitch housing fixed part is fixedly connected with the roll fine-tuning worm gear. The roll fine-tuning worm gear is a curved rack and the arc opening of the curved rack faces upward. The roll worm support seat is in rotatable contact with the pitch housing fixed part. The roll worm support seat is rotatably connected with the rotating base. The pitch adjusting assembly is detachably connected to the pitch support housing, and the bearing seat is specifically the bearing clamp seat 1.

In the above-mentioned embodiment provided by the present invention, the rotating base, the roll adjusting assembly, and the pitch adjusting assembly sequentially form a three-layer structure. In use, firstly the rotating base of the bottom layer is connected to a tripod, the camera is turned to the subject through the rotating base, then the second layer (roll adjusting assembly) is adjusted precisely through the roll fine-tuning knob so that the camera is leveled and corrected on the left and right, then the third layer is adjusted to aim at the photographed target, the pitch fine-tuning knob is rotated, the pitch fine-tuning worm is rotated to drive the pitch fine-tuning worm gear to rotate, and the pitch fine-tuning worm gear drives the bearing seat and the camera thereon to rotate in the pitch direction to achieve fine-tuning of the pitch direction. If it needs to greatly change the pitch angle to compose the picture, then the pitch fine-tuning clutch knob 8 can be released so as to turn the pitch adjusting assembly to the approximate position quickly, and then the clutch knob is tightened, and the pitch fine-tuning knob is used to precisely adjust the pitch angle; the above operations are adjusted in sequence from bottom to top. Regardless of whether the ground is flat or not, the camera remains level in the non-pitch direction during the pitching process. There is no need to adjust the left and right level again after the pitch angle is changed. The scene is a change of up and down angles without deflection, which is not only in line with photographing habits and convenient for photographic composition, but also very conducive to upward or downward movements during the photographing (while in the prior art, a pitching range of more than 180° has not been achieved, and strengthening the swing range of the upper layer of the pan-tilt using a more reasonable structure form to make the pitching operation more reasonable is not considered. As a result, when a large angle of pitching photographing is required and the camera stand is not placed on a flat ground, after the level is adjusted, if the pitch is adjusted, the scene will no longer only be a change of up and down angles, but deflection occurs at the same time). The swing range of the upper layer of the pan-tilt is strengthened by placing the worm gear and worm structure of the complete gear above the roll adjustment for the pitching action, which makes it easy for the pan-tilt to achieve a large angle pitch (specifically, an angular pitch exceeding −90° to 90°. This embodiment achieves a pitch angle of −105° to 105°, see FIG. 5). Therefore, the pan-tilt can simultaneously have a large pitch ability and precise leveling ability, and the photographic composition and photographing are very convenient, and the positioning is accurate.

The roll fine-tuning worm gear of the second layer adopts an arc-shaped rack, which makes full use of the characteristics of the arc-shaped rack. The limitation of the arc-shaped rack is that the adjustment range is small, and it is not suitable to undertake the pitch angle adjustment, but relative to the complete gear, the arc-shaped rack has many advantages to adjust the roll: firstly, it takes less height, which can reduce the overall height of the pan-tilt, which is convenient for adjustment in a limited size space, and the structure is more compact; secondly, the arc opening of the arc-shaped rack is disposed to face upwards, so that when the camera is leveled in this direction, the rotation axis is above and is closer to the position of the lens, so the camera displacement is small during leveling, and there is less unexpected picture movement during the leveling process; thirdly, due to the large bearing contact surface of the roll adjusting assembly using the curved rack structure, the bearing capacity and bearing stability are good; fourthly, the roll adjusting assembly using the curved rack does not need to be equipped with a large-scale adjusting clutch assembly, and does not have an operating rod extending out in the pitch direction, therefore causing the least interference with the pitch adjusting assembly arranged above it, so that the pitch adjusting assembly can perform a large-scale pitching action. The upper and lower combination of the two worm gear and worm structures strengthens the swinging ability above the pan-tilt in a limited size. The entire pan-tilt not only has the fast and accurate positioning of the gear pan-tilt within the limited size, but also reaches or exceeds the large range of pitching ability of the ball-type pan-tilt, and the whole pitching process can also maintain the left and right level.

Specifically, the pitch housing fixed part includes a pitch housing left fixed unit 7 and a pitch housing right fixed unit 4. The pitch housing left fixed unit and the pitch housing right fixed unit form a U-shaped piece. The pitch housing rotating part is located between the pitch housing left fixed unit and the pitch housing right fixed unit. The pitch fine-tuning screw is installed in the pitch housing left fixed unit or the pitch housing right fixed unit. The pitch fine-tuning worm gear is engaged with the pitch housing rotating part to drive the pitch housing rotating part to rotate.

Of course, the relative positional relationship between the pitch housing fixed part and the pitch housing rotating part can have another specific form. The pitch housing rotating part is an inverted U-shaped piece, and the pitch housing fixed part is located inside the inverted U-shaped piece. The pitch fine-tuning screw is installed in the pitch housing rotating part. The pitching fine-tuning worm gear is engaged with the pitch housing fixed part to drive the pitch housing rotating part to rotate.

In the foregoing embodiment, the pitch housing rotating is located between the pitch housing left fixed unit and the pitch housing right fixed unit. The pitch fine-tuning worm gear can be engaged with the pitch housing rotating part in the form of clutching. Specifically, the pan-tilt further includes a pull rod and a clutch knob 8. The pitch fine-tuning worm gear includes a gear part and a tapered piece on one side of the gear part. The pitch housing rotating part has a conical surface 19 engaged with the tapered surface of the tapered piece on the inner side thereof. One end of the pull rod is fixed connected with the tapered piece and the other end passes through the pitch housing rotating part to be threadedly connected with the clutch knob.

In this embodiment, when the clutch knob is released, the inside conical surface 19 of the pitch housing rotating part no longer has an interference fit with the tapered surface of the tapered piece, that is, the pitch fine-tuning worm gear and the rotating part are no longer fixedly connected, and the pitch housing rotating part 2 (camera bearing part) can perform a pitch adjustment quickly at a large angle; the clutch knob 8 is tightened step by step, the pull rod axially drives the tapered piece, so that the pull rod drives the pitch fine-tuning worm gear to move axially, the tapered piece of the pitch fine-tuning worm gear and the inside conical surface of the rotating part are closely engaged to realize the fixed connection of the pitch fine-tuning worm gear 3 and the pitch housing rotating part 2. At this time, the pitch fine-tuning knob 6 is rotated, the pitch fine-tuning worm 5 rotates to drive the pitch fine-tuning worm gear 3 to rotate, and the pitch fine-tuning worm gear 3 drives the pitch housing rotating part 2 and the camera thereon to rotate in the pitch direction to achieve pitch fine-tuning; because the gear of the third layer is not rigidly connected to the camera bearing part, but is clamped by the clutch knob 8, so that different damping can be provided by the lock and the release of the clutch knob 8. Hence, the pitch position can be quickly adjusted to meet the requirements that the pitch angle is large and it needs quick adjustments. Proper damping can further bring stability to the camera lens movement.

A handle installation position 20 is provided on the outer side of the pitch housing rotating part 2, which is specifically provided with an interface for installing a camera handle. The outer side of the pitch housing rotating part 2 is provided with a handle installation position. The handled installation position can be threadedly connected with a handle for the operation of camera pitch and lens movement.

Preferably, the tapered piece and the conical surface 19 of the pitch housing rotating part 2 can be made of damping materials. The mechanism arrangement of the clutch assembly, the tapered piece and the conical surface further provides adjustable damping for this pan-tilt when it is used for photographing so as to adapt to different speed of lens movement.

Specifically, it further includes a first dovetail track 14 and a second dovetail track 9. The first dovetail track 14 is provided on the roll worm support seat 11, and the second dovetail track 9 is provided at the bottom of the pitch housing left fixed unit 7. The first dovetail track 14 engages with the dovetail surface of the second dovetail track 9 for limiting rotation of the roll worm support seat 11 and the pitch housing left fixed unit 7. Through the engaging arrangement of the first dovetail track 14 and the second dovetail track 9, the sliding engagement and limited rotation of the roll worm support seat 11 and the pitch housing left fixed unit 7 are realized, and the accuracy of level adjustment is ensured.

In the foregoing embodiment, the bottom of the roll worm support seat 11 is rotatably connected with the rotating base 16 to realize the horizontal rotation of the pan-tilt on the tripod. The bottom of the roll worm support seat 11 and the rotating base 16 are locked tightly by rotating the base locking knob 15.

Specifically, the bearing seat is a bearing clamp seat, and the bearing clamp seat is fixedly connected or rotatably connected with the pitch housing rotating part. The top of the bearing clamp seat has a platform, and a dovetail groove is provided on the platform. One groove side of the dovetail groove is a movable groove side and the other groove side of the groove is a fixed groove side. The movable groove side is engaged with the fixed groove side through the clamp seat locking mechanism to install a quick installation piece 25 on the platform. The quick installation piece 25 is used for equipment installation, and the quick installation piece 25 has a dovetail limit rail 27 engaged with the dovetail groove.

Preferably, a positioning notch 17 is provided on the fixed groove side and/or on the movable groove side. A positioning member 26 is provided at a position of the dovetail limit rail corresponding to the positioning notch. The positioning notch is generally disposed at the position of the center line.

In this embodiment, the movable groove side and the fixed groove side clamp the quick installation piece or other equipment by the engagement of the clamp seat locking mechanism and are locked by the clamp seat locking knob 18. Due to the positioning notch disposed at the center line on the groove side, a positioning piece 26 (specifically, a positioning post) is disposed at the position of the dovetail limit rail corresponding to the positioning notch at the center line. The positioning post of the quick installation piece is engaged with the positioning notch to realize the quick installation and positioning of the quick installation piece and the bearing clamp seat, and the quick installation piece can be installed in one step in the middle position without adjustment. The pitching part (rotating part) can be directly connected to the camera or the horizontal rotating platform, and the roll adjustment at the bottom realizes the whole pitching without rolling, and realizes the pitching and independent axial camera lens movement of the photographing pam-tilt.

Furthermore, it further includes a handle bar 28, and the top of the bearing seat is provided with a screw hole or a sunken stud that can be connected to one end of the handle bar. The handle bar is formed by connecting multiple sections of rods through thread.

In this embodiment, the lower end of the handle has a screw hole to be engaged with the sunken stud 21. The disposing of the sunken stud 21 does not affect the platform to clamp other appliances. The sunken stud 21 on the top platform can be installed with a handle to support other equipment, such as a 360° panoramic camera, so as to increase the distance between the panoramic camera and the pan-tilt, so that the pan-tilt and the tripod can occupy a smaller picture in the 360° panoramic image. Of course, the top of the bearing seat can be provided with a screw hole, and one end of the handle is a stud to be engaged with it.

Further, it further includes a X-direction horizontal bubble 24, a Y-direction horizontal bubble 22, and a Z-direction horizontal bubble 23. The X-direction horizontal bubble 24 is horizontally arranged on the side of the bearing clamp seat 1 to facilitate calibration of the levelness of the bearing platform. The Y-direction horizontal bubble 22 is horizontally arranged on the outer side of the rotating part to facilitate the leveling of the rotating part. The Z-direction horizontal bubble 23 is arranged vertically on the outer side of the rotating part to facilitate the accuracy of pitch adjustment. The Z-direction horizontal bubble 23 is arranged on the rotating part, which is more reasonable compared with other parts of the pan-tilt. According to the bottom-up adjustment sequence of the pan-tilt, the pitching is the last step of adjustment, and the Z-direction horizontal bubble 23 is disposed on the rotating part to ensure the ready adjustment of the pitching.

The above description is only the preferred embodiments of the present invention. It should be pointed out that for those of ordinary skill in the art, without departing from the technical principles of the present invention, several improvements and modifications can be made. These improvements and modifications should also be regarded as the protection scope of the present invention.

What is claimed is:

1. A gear fine-tuning pan-tilt, characterized in that it comprises a rotating base, a roll worm support seat, a roll adjusting assembly, a pitch adjusting assembly and a bearing seat which are sequentially arranged from bottom to top; wherein the pitch adjusting assembly is supported by a pitch support housing, the pitch support housing comprises a pitch housing fixed part and a pitch housing rotating part that are rotatably engaged, a lower part of the rotating base is connected to a pan-tilt support; the pitch adjusting assembly comprises a pitch fine-tuning worm gear, a pitch fine-tuning worm and a pitch fine-tuning knob, the bearing seat is connected with the pitch housing rotating part, the pitch fine-tuning worm gear is engaged with the pitch fine-tuning worm, the pitch fine-tuning knob is connected to an end of the pitch fine-tuning worm, the pitch fine-tuning worm gear is a complete gear structure; the roll adjusting assembly comprises a roll fine-tuning worm gear, a roll fine-tuning worm, and a roll fine-tuning knob, the roll fine-tuning worm gear is engaged with the roll fine-tuning worm, the roll fine-tuning worm is arranged on the roll worm support seat, the roll fine-tuning knob is connected to an end of the roll fine-tuning worm; the bottom of the pitch housing fixed part is fixedly connected with the roll fine-tuning worm gear; the roll fine-tuning worm gear is an arc-shaped rack, an arc opening of the arc-shaped rack faces upward; the roll worm support seat is in rotational contact with the pitch housing fixed part; the roll worm support seat is rotatably connected with the rotating base.

2. The gear fine-tuning pan-tilt according to claim 1, wherein the pitch housing fixed part comprises a pitch housing left fixed unit and a pitch housing right fixed unit, the left fixed unit and the right fixed unit form a U-shaped piece, the pitch housing rotating part is located between the left fixed unit and the right fixed unit; a pitch fine-tuning screw is installed in the left fixed part or the right fixed part, and the pitch fine-tuning worm gear is engaged with the pitch housing rotating part to drive the pitch housing rotating part to rotate.

3. The gear fine-tuning pan-tilt according to claim 1, wherein the pitch housing rotating part is an inverted U-shaped piece, the pitch housing fixed part is located inside the inverted U-shaped piece; a pitch fine-tuning screw is installed in the pitch housing rotating part and the pitch fine-tuning worm gear is engaged with the pitch housing fixed part to drive the pitch housing rotating part to rotate.

4. The gear fine-tuning pan-tilt according to claim 2, wherein a handle installation position is provided outside the pitch housing rotating part.

5. The gear fine-tuning pan-tilt according to claim 2, further comprising a pull rod and a clutch knob, wherein the pitch fine-tuning worm gear comprises a gear part and a tapered piece on one side of the gear part, the pitch housing rotating part has a conical surface engaged with the tapered surface of the tapered piece on the inside thereof, one end of the pull rod is fixedly connected to the tapered piece, and the other end passes through the pitch housing rotating part to be threadedly connected with the clutch knob.

6. The gear fine-tuning pan-tilt of claim 1, further comprising a first dovetail track and a second dovetail track, wherein the roll worm support seat is provided with the first dovetail track, the pitch housing fixed part is provide with the second dovetail track at the bottom thereof, and the first dovetail track is engaged with a dovetail surface of the second dovetail track for limiting rotation of the roll worm support seat and the pitch housing fixed part.

7. The gear fine-tuning pan-tilt according to claim 1, wherein the bearing seat is a bearing clamp seat, the bearing clamp seat is fixedly connected or rotationally connected with the pitch housing rotating part, a platform is disposed on the top of the bearing clamp seat, and a dovetail groove is provided on the platform, one groove side of the dovetail groove is a movable groove side, the other groove side is a fixed groove side, the movable groove side is engaged with the fixed groove side by a clamp seat locking mechanism so as to install a quick installation piece on the platform, the quick installation piece is used for equipment installation, and the quick installation piece has a dovetail limit rail that engaged with the dovetail groove.

8. The gear fine-tuning pan-tilt according to claim 7, wherein the fixed groove side and/or the movable groove side is provided with a positioning notch, and a positioning piece is disposed at the position of the dovetail limit rail corresponding to the positioning notch.

9. The gear fine-tuning pan-tilt according to claim 4, further comprising a handle bar, wherein a screw hole or a sunken stud connected to one end of the handle bar is disposed on the top of the bearing seat.

10. The gear fine-tuning pan-tilt according to claim 1 further comprising a X-direction horizontal bubble, a Y-direction horizontal bubble and a Z-direction horizontal bubble, the X-direction horizontal bubble is disposed on the side surface of the bearing seat, the Y-direction horizontal bubble is horizontally arranged on the outer side of the pitch housing rotating part, and the Z-direction horizontal bubble is arranged vertically on the outer side of the pitch housing rotating part.

\* \* \* \* \*